March 3, 1931.  E. C. DENNERT ET AL  1,794,675

AUTOMOBILE JACK

Filed Sept. 22, 1928

INVENTORS
Edward C. Dennert,
Harry St. Bernard
BY
ATTORNEYS

Patented Mar. 3, 1931

1,794,675

UNITED STATES PATENT OFFICE

EDWARD C. DENNERT AND HARRY ST. BERNARD, OF DETROIT, MICHIGAN, ASSIGNORS OF ONE-THIRD TO JOSEPH PAONESSA, OF DETROIT, MICHIGAN

AUTOMOBILE JACK

Application filed September 22, 1928. Serial No. 307,723.

The present invention pertains to a novel jack, being designed especially to become permanent equipment upon automobiles and similar vehicles.

A primary object of the present invention is to eliminate the inconvenience found in employing the ordinary automobile jack which must be carefully placed in position under the axle of the vehicle in order to elevate a wheel in case of an emergency by equipping the automobile with a jack which is always in place and ready for use. In the use of the ordinary jack, satisfactory results are difficult to obtain on irregular surfaces, and great unpleasantness results under such conditions as muddy or wet roads. The present invention, in order to overcome these inconveniences, is permanently attached to the vehicle, on the front and rear axles and thereby permits rapid elevation and lowering of either or both ends of the vehicle in cases of emergency such as for the removal of a tire, there being no necessity for placing a portable jack under the vehicle.

A further object of the invention is to construct a jack, which may be permanently attached to the forward and rear axles on the centre line of an automobile, which will not decrease the road clearance of either axle. The present jack is located on the centre line of the vehicle in such manner as to elevate one of the ends in case of emergency for removing a tire, or to elevate both ends for purposes of winter storage and thereby increase the useful life of the tires by relieving them of the weight of the vehicle.

With these objects in view and others which will become apparent, our invention is fully disclosed by way of example in the following description, reference being had to the accompanying drawings, in which Figure 1 is a side elevation of an automobile with the wheels on one side removed, the axles being in cross section and equipped with jacks according to the present invention;

Figure 1:
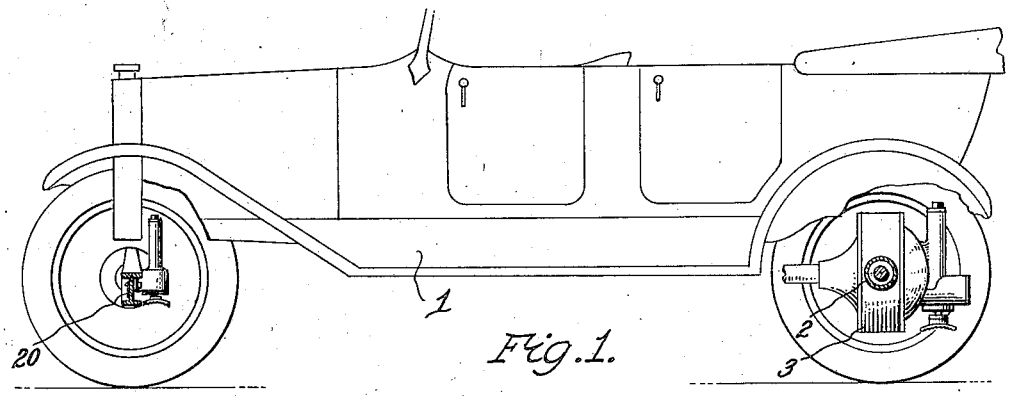
Figures 3, 4:
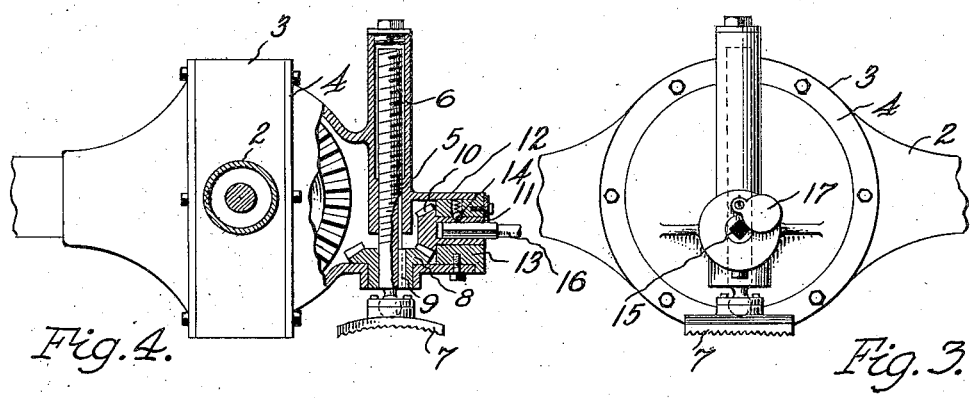
Figure 3 is an elevational view of the rearwardly exposed face of the rear axle jack equipped upon the differential housing with the rear axle housing broken away.
Figure 4 is a cross sectional view through the rear axle housing showing the rear axle jack in cross section.

The numeral 1 indicates an automobile constructed according to the conventional standards, having a rear axle enclosed in the axle housing 2 and a differential gearing housing 3. A plate 4 is attached to the differential housing 3 by means of bolts or rivets, the plate 4 supporting the jack casing which is provided with a screwthreaded bearing 5 which supports the screw 6. The upper end of the screw 6 is adapted to extend upwardly in an extended portion of the jack casing, the lower end projecting outside the casing and being provided with a ground engaging member 7.

A bevelled gear 8 is supported within the jack casing and loosely surrounds the screw 6, the gear 8 being provided with a key 9 engaging in a keyway in the screw 6 whereby to be capable of imparting rotary movement to the screw and to allow the screw to change its position longitudinally with relation to the gear. A second bevelled gear 10 meshes with the gear 8, the gear 10 having a boss 11 rotatably mounted in a protuberant portion 12 of the jack casing by means of a nut 13 retained in the portion 12. The nut 13 contains a spring actuated ball 14 which is received in an indentation in the boss 11 to prevent rotation of the gears 8 and 10 when rotation is not desirable. The outer end of the boss 11 is provided with an angular recess 15 into which is inserted the angular end of a crank 16 for revolving the gear 10. The spring actuated ball 14 when received in the indentation in the boss 11 is sufficient to prevent the screw from lowering or raising of its own accord while not being great enough to resist turning of the gear by the crank 16.

In operation the gear 10 when revolved by means of the crank 16 causes the gear 8 to revolve the screw 6, the screw bearing 5 causing the screw to be raised or lowered according to the direction of rotation. The ground engaging member 7 is brought into contact with the ground surface and continued rotation causes the end of the automobile to be raised to any desired position, in which position it is maintained by means of the spring actuated ball 14 which permits the crank 16 to be removed, at which time the opening may be covered by a pivoted dust plate 17.

Figures 5, 6, 7:
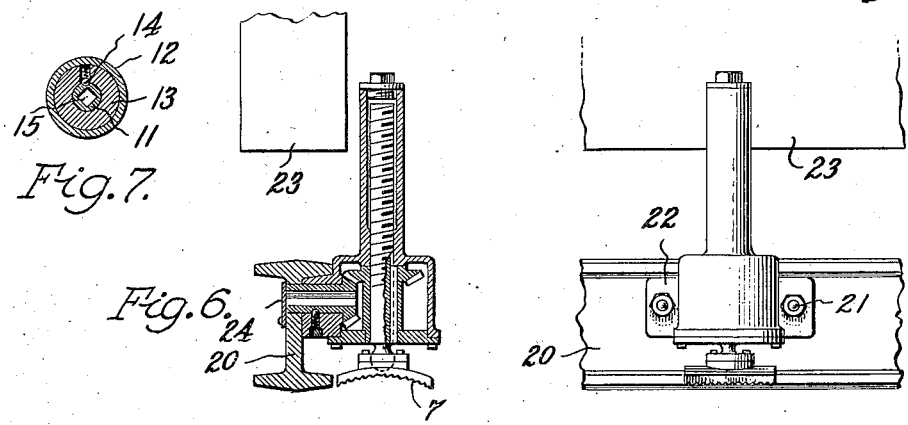
Figure 5 is an elevation of the jack applied to the front axle.
Figure 6 is a cross sectional view of the jack and front axle.
Figure 7 is a cross sectional view through the jack locking mechanism.
Figure 2:
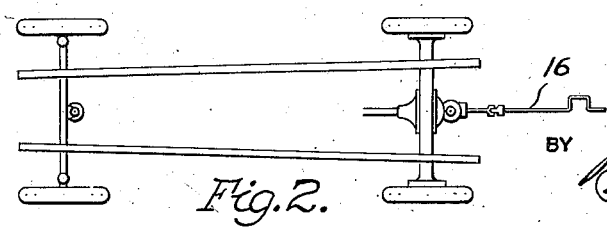
Figure 2 is a plan view of the chassis of the automobile equipped with jacks, illustrating the detachable operating crank.

As illustrated in Figures 5 and 6 the jack casing is attached to the front axle 20 by means of bolts 21 passing through the axle to engage flanges 22 upon the jack casing. The casing is attached in this manner to the rear face of the front axle and extends upwardly, passing to the rear of the radiator 23. The boss 11 on the gear 10 in this attachment passes through the axle 20 and is actuated by the crank 16 from the front of the automobile, a dust cover 24 being pivoted to the front axle to cover the opening when the crank 16 is removed.

Although specific embodiments of our invention have been illustrated and described, it will be understood that various alterations may be made in the details of construction without departing from the spirit of the invention, as depicted by the following claims.

What we claim is:—

1. The combination with an automobile, of a plate adapted to be secured to the axle housing thereof, a casing mounted on said plate, a vertical screw mounted in said casing and having its lower end projecting therefrom, a bevelled gear mounted in said casing to surround said screw and keyed thereto, a second bevelled gear mounted in said casing and adapted to mesh with said first named gear, means for manually rotating said second named bevelled gear for imparting rotary movement to said first named gear whereby said screw is caused to raise or lower, and means in said casing and acting on said second named bevelled gear for preventing accidental rotation thereof.

2. The combination with an automobile having a banjo type of transmission housing, of a cover plate for said banjo housing, a casing formed integral with said plate, a vertical screw-threaded shaft mounted in said casing and having its lower end projecting therefrom, gears mounted in said housing and adapted to rotate said screw-threaded shaft to impart vertical movement thereto, means for rotating said gears, and means mounted in said housing and acting on one of said gears for preventing rotation thereof except by said gear rotating means.

3. The combination with an automobile having a banjo type of transmission housing, of a cover plate for said banjo housing, a casing formed integral with said plate, a vertical screw-threaded shaft mounted in said casing, and having its lower end projecting therefrom, gears mounted in said housing and adapted to rotate said screw-threaded shaft to impart vertical movement thereto, means for rotating said gears, a recess formed in one of said gears, and a spring actuated ball mounted in said casing and adapted to project into said recess for preventing rotation of said gears.

In testimony whereof we affix our signatures.

EDWARD C. DENNERT
HARRY ST. BERNARD.